United States Patent
Beall et al.

(10) Patent No.: US 10,357,945 B2
(45) Date of Patent: Jul. 23, 2019

(54) LAMINATED GLASS ARTICLE WITH CERAMIC PHASE AND METHOD OF MAKING THE ARTICLE

(71) Applicant: CORNING INCORPORATED, Corning, NY (US)

(72) Inventors: George Halsey Beall, Big Flats, NY (US); Heather Debra Boek, Corning, NY (US); Natesan Venkataraman, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 422 days.

(21) Appl. No.: 14/432,415

(22) PCT Filed: Oct. 4, 2013

(86) PCT No.: PCT/US2013/063403
§ 371 (c)(1),
(2) Date: Mar. 30, 2015

(87) PCT Pub. No.: WO2014/055837
PCT Pub. Date: Apr. 10, 2014

(65) Prior Publication Data
US 2015/0251383 A1 Sep. 10, 2015

Related U.S. Application Data

(60) Provisional application No. 61/744,850, filed on Oct. 4, 2012.

(51) Int. Cl.
*C03B 17/02* (2006.01)
*C03B 17/06* (2006.01)
(Continued)

(52) U.S. Cl.
CPC .............. *B32B 17/06* (2013.01); *B32B 37/15* (2013.01); *B32B 38/0036* (2013.01);
(Continued)

(58) Field of Classification Search
None
See application file for complete search history.

(56) References Cited

U.S. PATENT DOCUMENTS 3,282,770 A  11/1966  Stookey
3,498,775 A  3/1970  Simmons
(Continued)

FOREIGN PATENT DOCUMENTS

GB  1380781  1/1975
GB  1509644  5/1978
(Continued)

OTHER PUBLICATIONS

International Search Report and Written Opinion, dated Apr. 15, 2014, pp. 1-11, International Application No. PCT/US2013/063403, European Patent Office, The Netherlands.
(Continued)

*Primary Examiner* — Lisa L Herring
(74) *Attorney, Agent, or Firm* — Svetlana Z. Short; Michael A. Hood

(57) ABSTRACT

A method for forming a laminated glass article with a ceramic phase, such as a beta-spodumene phase, located at least at the junctures between a glass core and directly adjacent glass clad layers, and in some embodiments located throughout the laminated glass article. In some embodiments, a method is disclosed herein for forming a beta-spodumene glass-ceramic sheet, or a laminated glass article having a ceramic phase, or a laminated glass article having a beta-spodumene glass-ceramic, is disclosed.

7 Claims, 1 Drawing Sheet

(51) Int. Cl.
*C03B 32/02* (2006.01)
*C03C 10/00* (2006.01)
*C03C 21/00* (2006.01)
*C03B 27/012* (2006.01)
*B32B 17/06* (2006.01)
*B32B 37/15* (2006.01)
*B32B 38/00* (2006.01)

(52) U.S. Cl.
CPC ............ *C03B 17/02* (2013.01); *C03B 17/064* (2013.01); *C03B 17/067* (2013.01); *C03B 27/012* (2013.01); *C03B 32/02* (2013.01); *C03C 10/00* (2013.01); *C03C 10/0027* (2013.01); *C03C 21/002* (2013.01); *C03C 21/008* (2013.01); *B32B 2307/558* (2013.01); *B32B 2457/00* (2013.01); *B32B 2457/12* (2013.01); *B32B 2457/202* (2013.01); *B32B 2457/208* (2013.01)

(56) References Cited

U.S. PATENT DOCUMENTS

| | | | |
|---|---|---|---|
| 3,597,305 A | | 8/1971 | Giffen |
| 3,633,193 A | | 1/1972 | Milo |
| 3,637,453 A | | 1/1972 | Simmons |
| 3,673,049 A | | 6/1972 | Giffen et al. |
| 3,737,294 A | | 6/1973 | Dumbaugh, Jr. et al. |
| 3,746,526 A | | 7/1973 | Giffon |
| 3,849,097 A | | 11/1974 | Giffen et al. |
| 3,854,919 A | | 12/1974 | Pirooz |
| 3,931,438 A | * | 1/1976 | Beall ............ C03B 17/02 428/218 |
| 3,992,179 A | * | 11/1976 | Simmons ............ C03C 10/00 65/30.14 |
| 4,093,468 A | | 6/1978 | Boitel et al. |
| 4,102,664 A | | 7/1978 | Dumbaugh, Jr. |
| 4,130,680 A | | 12/1978 | Ference et al. |
| 4,148,661 A | | 4/1979 | Kerko et al. |
| 4,212,678 A | | 7/1980 | Chyung et al. |
| 4,214,886 A | | 7/1980 | Shay et al. |
| 4,405,672 A | | 9/1983 | Araujo et al. |
| 4,455,160 A | | 6/1984 | Rittler |
| 4,480,044 A | | 10/1984 | McAlinn |
| 4,486,213 A | | 12/1984 | Lentz et al. |
| 4,726,981 A | | 2/1988 | Pierson et al. |
| 5,212,122 A | | 5/1993 | Pannhorst et al. |
| 5,342,426 A | | 8/1994 | Dumbaugh, Jr. |
| 5,411,563 A | | 5/1995 | Yeh et al. |
| 5,422,318 A | | 6/1995 | Hagg et al. |
| 5,559,060 A | | 9/1996 | Dumbaugh, Jr. et al. |
| 5,691,256 A | | 11/1997 | Taguchi et al. |
| 5,723,945 A | | 3/1998 | Schermerhorn |
| 6,515,263 B2 | | 2/2003 | Mitra et al. |
| 6,677,046 B2 | | 1/2004 | Hachitani et al. |
| 7,201,965 B2 | | 4/2007 | Gulati et al. |
| 7,382,541 B2 | | 6/2008 | Inoue et al. |
| 7,465,686 B2 | | 12/2008 | Comte |
| 7,479,949 B2 | | 1/2009 | Jobs et al. |
| 7,514,149 B2 | | 4/2009 | Bocko et al. |
| 7,635,521 B2 | | 12/2009 | Aitken et al. |
| 7,829,489 B2 | | 11/2010 | Borrelli et al. |
| 8,007,913 B2 | | 8/2011 | Coppola et al. |
| 9,522,836 B2 | | 12/2016 | Gulati et al. |
| 2001/0051583 A1 | | 12/2001 | Nagata et al. |
| 2004/0197575 A1 | | 10/2004 | Bocko et al. |
| 2006/0127679 A1 | | 6/2006 | Gulati et al. |
| 2007/0149379 A1 | | 6/2007 | Hsu et al. |
| 2007/0190340 A1 | * | 8/2007 | Coppola ............ B32B 17/06 428/432 |
| 2008/0062148 A1 | | 3/2008 | Hotelling et al. |
| 2008/0143690 A1 | | 6/2008 | Jang et al. |
| 2009/0142568 A1 | | 6/2009 | Dejneka et al. |
| 2010/0304948 A1 | | 12/2010 | Comte et al. |
| 2011/0217657 A1 | | 9/2011 | Flemming et al. |
| 2012/0135848 A1 | | 5/2012 | Beall et al. |
| 2014/0141217 A1 | * | 5/2014 | Gulati ............ C03C 3/091 428/212 |

FOREIGN PATENT DOCUMENTS

| | | |
|---|---|---|
| GB | 2315266 | 1/1998 |
| JP | 62246840 A | 10/1987 |
| JP | 63151647 A | 6/1988 |
| JP | 336781 A | 2/1991 |
| JP | 346308 A | 2/1991 |
| JP | 3242348 A | 10/1991 |
| JP | 05009039 A | 1/1993 |
| JP | 2000/178036 | 6/2000 |
| JP | 2002321940 A | 11/2002 |
| JP | 2009114005 A | 5/2009 |
| WO | WO 2007/146785 | 12/2007 |
| WO | WO2008/150355 | 12/2008 |
| WO | 2012005941 A1 | 1/2012 |
| WO | WO2013/130718 | 9/2013 |
| WO | 2013155281 A1 | 10/2013 |

OTHER PUBLICATIONS

English Translation of JP2015535814 Office Action dated Jun. 6, 2017; 5 Pages; Japanese Patent Office.
CN201380061504.8 First Office Action dated May 5, 2016.
English Translation of CN201380061504.8 Second Office Action dated Jan. 19, 2017.
European Patent Application No. 13777428.7 Office Action dated Feb. 14, 2018; 10 Pages; European Patent Office.
EP13777428.7 Notice of Allowance dated Apr. 18, 2019, European Patent Office.

* cited by examiner

LAMINATED GLASS ARTICLE WITH CERAMIC PHASE AND METHOD OF MAKING THE ARTICLE

This application claims the benefit of priority under 35 U.S.C. § 371 of International Application No. PCT/US2013/063403, filed on Oct. 4, 2013, which claims the benefit of priority under 35 U.S.C. § 119 of U.S. Provisional Application Ser. No. 61/744,850, filed on Oct. 4, 2012, the content of each of which is relied upon and incorporated herein by reference in its entirety.

BACKGROUND

Field

The present specification generally relates to articles comprised of glass layers and a ceramic phase and, more specifically, to laminated articles comprising a glass core sandwiched between first and second glass clad layers, with a ceramic phase, such as a beta-spodumene phase, at least at the junctures between the core and the clad layers.

Technical Background

Glass articles, such as cover glasses, glass backplanes and the like, are employed in both consumer and commercial electronic devices such as LCD and LED displays, computer monitors, automated teller machines (ATMs) and the like. Some of these glass articles may include "touch" functionality which necessitates that the glass article be contacted by various objects including a user's fingers and/or stylus devices and, as such, the glass must be sufficiently robust to endure regular contact without damage. Moreover, such glass articles may also be incorporated in portable electronic devices, such as mobile telephones, personal media players, and tablet computers. The glass articles incorporated in these devices may be susceptible to damage during transport and/or use of the associated device. Accordingly, glass articles used in electronic devices may require enhanced strength to be able to withstand not only routine "touch" contact from actual use, but also incidental contact and impacts which may occur when the device is being transported.

SUMMARY

According to the present disclosure, a method for forming a laminated glass article with a ceramic phase, such as a beta-spodumene phase, located at least at the junctures between a glass core and directly adjacent glass clad layers, and in some embodiments located throughout the laminated glass article. In some embodiments, a method is disclosed herein for forming a beta-spodumene glass-ceramic sheet, or a laminated glass article having a beta-spodumene glass-ceramic, is disclosed.

In some embodiments, a method is disclosed for forming a beta-spodumene glass ceramic sheet by forming, with the fusion lamination process, a laminate glass sheet having cladding layers formed from a lithium-rich glass composition and a core layer formed from a sodium-rich (lithium deficient) glass composition; heat treating the laminate glass sheet to exchange alkali ions between the core and cladding layers; and heat treating the laminate glass sheet a second time to nucleate and grow a ceramic phase in the laminate glass sheet.

In some embodiments, a method is disclosed which comprises preparing a lithium-rich glass composition which has a low liquidus viscosity and, as such, would not be fusion formable on its own. This lithium-rich glass composition is used as the cladding layers in the fusion lamination process. A sodium rich (lithium deficient) glass composition which has a higher liquidus viscosity is used to form the core of the laminate via the fusion lamination process. Following formation of the laminate structure by the fusion lamination process, the laminate is heat treated to diffuse lithium ions from the clad to the core and sodium ions from the core to the clad. A second heat treatment step is then used to nucleate and grow the beta-spodumene phase in the glass laminate.

In another set of embodiments, a glass article is disclosed which also comprises a beta-spodumene phase, the glass article comprising a glass core layer disposed between a first glass cladding layer and a second glass cladding layer. In some of these embodiments, the core glass may have a first surface and a second surface opposite the first surface, where the first glass cladding layer may be fused to the first surface of the glass core layer and a second glass cladding layer may be fused to the second surface of the glass core layer. In other embodiments, a first diffusive glass layer may be disposed between the glass core layer and the first glass cladding layer; additionally a second diffusive glass layer may be disposed between the glass core layer and the second glass cladding layer; these diffusive layers may be formed during, for example, the fusion forming process, or in one or more post-fusion draw heat treatment steps.

In some embodiments, the first glass cladding layer and the second glass cladding layer are formed from one or more lithium-containing glass compositions; in some embodiments the first glass cladding layer and the second glass cladding layer are formed from one or more lithium-rich glass compositions; in some embodiments the first glass cladding layer and the second glass cladding layer are formed from one or more lithium-rich, sodium-deficient glass compositions, such as relative to the glass core layer.

In some embodiments, the glass core layer is formed from a sodium-containing glass composition; in some embodiments the glass core layer is formed from a sodium-rich glass composition; in some embodiments the glass core layer is formed from a sodium-rich glass, lithium-deficient glass composition, such as relative to the glass clad layer(s).

In some embodiments, following formation of the laminate structure by the fusion lamination process, the laminate structure is heat treated to diffuse lithium ions from the clad to the core and sodium ions from the core to the clad. A second heat treatment step is then used to nucleate and grow the beta-spodumene phase in the glass laminate.

In another aspect, a fusion-formed ferroelectric glass-ceramic based multi-touch display article is disclosed herein that combines high transparency with a high dielectric constant, as well as high strength and toughness. In some embodiments, such article does not require an ion exchange process for glass strengthening. The fusion-formed glass-ceramic can be used for multi-touch capacitive display devices based on a transparent ferroelectric glass-ceramic substrate. The ferroelectric glass-ceramic substrate can be made by utilizing an annealing cycle after glass sheet formation on the laminate fusion draw. The transparency of the ferroelectric glass-ceramic can be achieved by using an annealing cycle long enough to make the crystallite size in the substrate large compared to the wavelength of visible light (the forward-scattering case). The presence of even small crystallites can increase the dielectric constant by about 10 times compared to that of a pure glass.

Additional features and advantages of the glass compositions and glass articles formed from the glass compositions will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
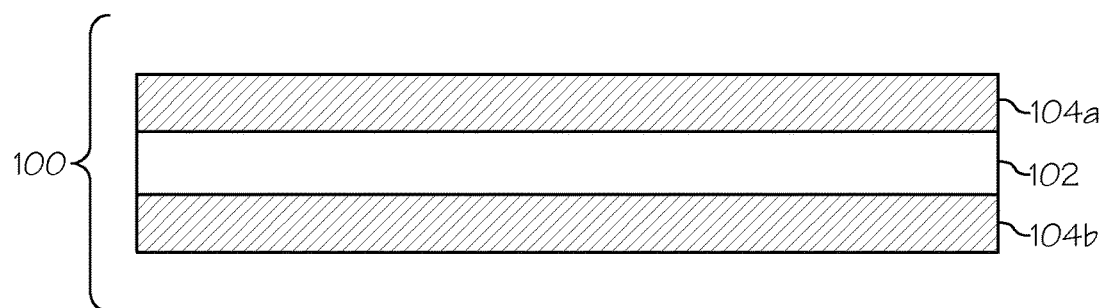
FIG. 1 schematically depicts a cross section of a laminated glass article according to one or more embodiments shown and described herein.

Reference will now be made in detail to embodiments of glass-ceramic compositions disclosed herein and articles incorporating the same, examples of which are illustrated in the accompanying drawings. Whenever possible, the same reference numerals will be used throughout the drawings to refer to the same or like parts.

The term "liquidus viscosity," as used herein, refers to the shear viscosity of the glass composition at its liquidus temperature.

The term "liquidus temperatures," as used herein, refers to the highest temperature at which devitrification occurs in the glass composition The term "CTE," as used herein, refers to the coefficient of thermal expansion of the glass composition averaged over a temperature range from about 20° C. to about 300° C.

The term "substantially free," when used to described the absence of a particular oxide component in a glass composition, means that the component is present in the glass composition as a contaminant in a trace amount of less than 1 mol. %.

In the embodiments of the glass compositions described herein, the concentration of constituent components (e.g., $SiO_2$, $Al_2O_3$, $Na_2O$ and the like) are given in mole percent (mol. %) on an oxide basis, unless otherwise specified.

The glass compositions described herein may optionally include one or more fining agents. The fining agents may include, for example, $SnO_2$, $As_2O_3$, $Sb_2O_3$ and combinations thereof. The fining agents may be present in the glass compositions in an amount greater than or equal to about 0 mol. % and less than or equal to about 0.5 mol. %. In exemplary embodiments, the fining agent is $SnO_2$. In these embodiments, $SnO_2$ may be present in the glass composition in a concentration which is greater than about 0 mol. % and less than or equal to about 0.2 mol. % or even less than or equal to about 0.15 mol. %.

In some embodiments described herein, the glass compositions may further comprise trace amounts of other oxides.

In some embodiments described herein, the glass compositions are substantially free of heavy metals and compounds containing heavy metals. Glass compositions which are substantially free from heavy metals and compounds containing heavy metals may also be referred to as "Super-Green" glass compositions. The term "heavy metals," as used herein, refers to Ba, As, Sb, Cd, and Pb.

The glass compositions disclosed herein have a liquidus viscosity which renders them suitable for use in a fusion draw process and, in particular, for use as a glass cladding composition or a glass core composition in a fusion laminate process.

Referring now to FIG. 1, the glass compositions described herein may be used to form an article, such as the laminated glass article 100 schematically depicted in cross section in FIG. 1. The laminated glass article 100 generally comprises a glass core layer 102 and a pair of glass cladding layers 104a, 104b. The glass compositions described herein are particularly well suited for use as the glass claddings layers, as will be discussed in more detail herein.

FIG. 1 illustrates the glass core layer 102 shown comprising a first surface 103a and a second surface 103b which is opposed to the first surface 103a. A first glass cladding layer 104a is fused directly to the first surface 103a of the glass core layer 102 and a second glass cladding layer 104b is fused directly to the second surface 103b of the glass core layer 102. Post-ceramming, the glass cladding layers 104a, 104b are fused to the glass core layer 102 without any additional materials, such as adhesives, polymer layers, coating layers or the like, being disposed between the glass core layer 102 and the glass cladding layers 104a, 104b. Thus, a first surface of the glass core layer is directly adjacent the first glass cladding layer, and a second surface of the glass core layer is directly adjacent the second glass cladding layer. In some embodiments, the glass core layer 102 and the glass cladding layers 104a, 104b are formed via a fusion lamination process. Diffusive layers (not shown) may form between the glass core layer 102 and the glass cladding layer 104a, or between the glass core layer 102 and the glass cladding layer 104b, or both.

In at least some embodiments of the laminated glass article 100 described herein, the glass cladding layers 104a, 104b are formed from a first glass-ceramic composition having an average cladding coefficient of thermal expansion $CTE_{clad}$ and the glass core layer 102 is formed from a second, different glass composition which has an average coefficient of thermal expansion $CTE_{core}$.

Figure 2:
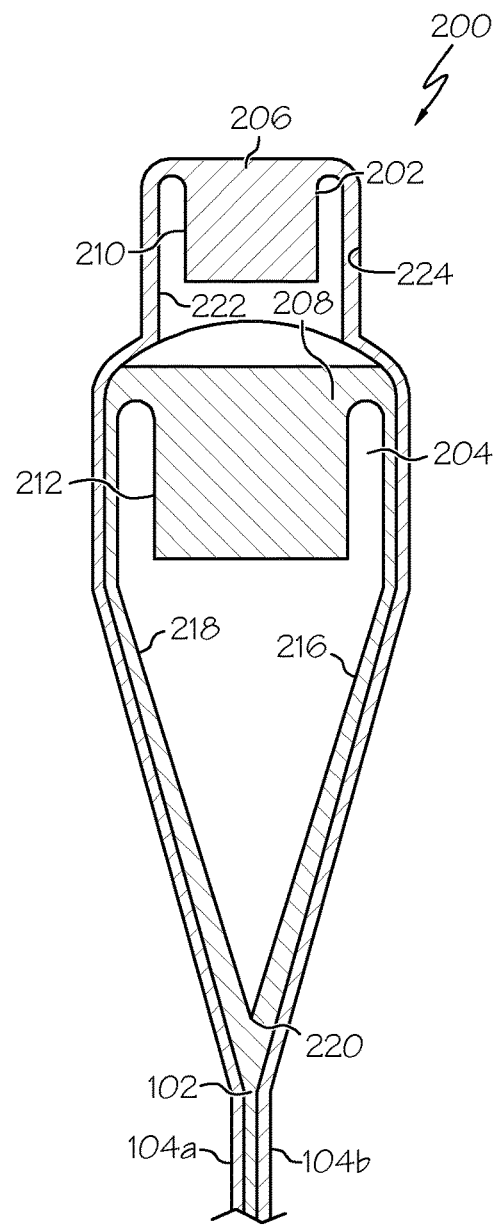
FIG. 2 schematically depicts a fusion draw process for making the glass article of FIG. 1.

Specifically, the glass articles 100 described herein may be formed by a fusion lamination process such as the process described in U.S. Pat. No. 4,214,886, which is incorporated herein by reference. Referring to FIG. 2 by way of example, a laminate fusion draw apparatus 200 for forming a laminated glass article includes an upper isopipe 202 which is positioned over a lower isopipe 204. The upper isopipe 202 includes a trough 210 into which a molten glass cladding composition 206 is fed from a melter (not shown). Similarly, the lower isopipe 204 includes a trough 212 into which a molten glass core composition 208 is fed from a melter (not shown). In the embodiments described herein, the molten glass core composition 208 has an appropriately high liquidus viscosity to be run over the lower isopipe 204.

As the molten glass core composition 208 fills the trough 212, it overflows the trough 212 and flows over the outer forming surfaces 216, 218 of the lower isopipe 204. The outer forming surfaces 216, 218 of the lower isopipe 204 converge at a root 220. Accordingly, the molten glass core composition 208 flowing over the outer forming surfaces 216, 218 rejoins at the root 220 of the lower isopipe 204 thereby forming a glass core layer 102 of a laminated glass structure.

Simultaneously, the molten glass-ceramic cladding compositions 206 overflows the trough 210 formed in the upper isopipe 202 and flows over outer forming surfaces 222, 224 of the upper isopipe 202. The molten glass-ceramic cladding composition 206 has a lower liquidus viscosity requirement to be run on the upper isopipe 202, and will have a CTE either equal to or less than the glass core composition 208 (for example, within about $5\times10^{-7}$/° C.) when present as a glass. The molten glass-ceramic cladding composition 206 is outwardly deflected by the upper isopipe 202 such that the molten glass cladding composition 206 flows around the lower isopipe 204 and contacts the molten glass core composition 208 flowing over the outer forming surfaces 216, 218 of the lower isopipe, fusing to the molten glass core composition and forming pre-cerammed glass cladding layers 104a, 104b around the glass core layer 102.

In some embodiments, in the laminated sheet so formed, the clad thickness will also be significantly thinner than the core glass thickness so that the clad goes into compression and the core into tension. But as the CTE difference is low, the magnitude of the tensile stress in the core will be very low (e.g on the order of 10 MPa or lower) which will allow for the production of a laminated sheet that will be relatively easy to cut off the draw due to its low levels of core tension. Sheets can thus be cut from the laminate structure that is drawn from the fusion draw apparatus, and after the sheets are cut, the cut product can then be subjected to a suitable heat treatment(s).

The laminated glass articles disclosed herein may be employed in a variety of consumer electronic devices including, without limitation, mobile telephones, personal music players, tablet computers, LCD and LED displays, automated teller machines and the like.

In some embodiments, the laminated glass article may comprises one or more layers which are opaque, transparent or translucent, such as a clad derived from a glass composition wherein the clad layer is opaque, transparent or translucent after heat treatment(s). Furthermore, the use of glass in sheet form can be utilized.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method for forming a laminated glass article having a ceramic phase, the method comprising:
   forming, via fusion draw, a laminate glass sheet having cladding layers formed from a first glass composition rich in a first alkali and a core layer formed from a second glass composition rich in a second alkali, wherein the first alkali is lithium and the second alkali is sodium and the laminate glass sheet comprises diffusive glass layers disposed between the cladding layers and the core layer;
   heat treating the laminate glass sheet to exchange ions of the first and second alkalis between the core and cladding layers; and
   heat treating the laminate glass sheet a second time to nucleate and grow a ceramic phase in the laminate glass sheet after the heat treating the laminate glass sheet to exchange ions, wherein the ceramic phase is located only in the diffusive glass layers at junctures between the cladding layers and the core layer.

2. The method of claim 1 wherein the laminate glass sheet is heated sufficient to compressively stress at least one of the cladding layers.

3. The method of claim 1 wherein the ceramic phase is a beta-spodumene phase.

4. The method of claim 1 further comprising cutting the laminate glass sheet subsequent to the forming step and prior to the heat treating the laminate glass sheet to nucleate and grow a ceramic phase step.

5. A method for forming a laminated glass article having a ceramic phase, the method comprising:
   forming, via fusion draw, a laminate glass sheet having cladding layers formed from a first glass composition rich in a first alkali and a core layer formed from a second glass composition rich in a second alkali, wherein the first alkali is lithium and the second alkali is sodium, the cladding layers have an average cladding coefficient of thermal expansion $CTE_{clad}$, the core layer has an average core coefficient of thermal expansion $CTE_{core}$, $CTE_{clad}$ is less than $CTE_{core}$, and a differential between $CTE_{clad}$ and $CTE_{core}$ is less than $5\times10^{-7}$/° C.;
   heat treating the laminate glass sheet to exchange ions of the first and second alkalis between the core and cladding layers; and
   heat treating the laminate glass sheet a second time to nucleate and grow a ceramic phase in the laminate glass sheet after the heat treating the laminate glass sheet to exchange ions.

6. The method of claim 5 wherein the laminate glass sheet is heated sufficient to compressively stress at least one of the cladding layers.

7. The method of claim 5 wherein the ceramic phase is a beta-spodumene phase.

* * * * *